Figure 1:
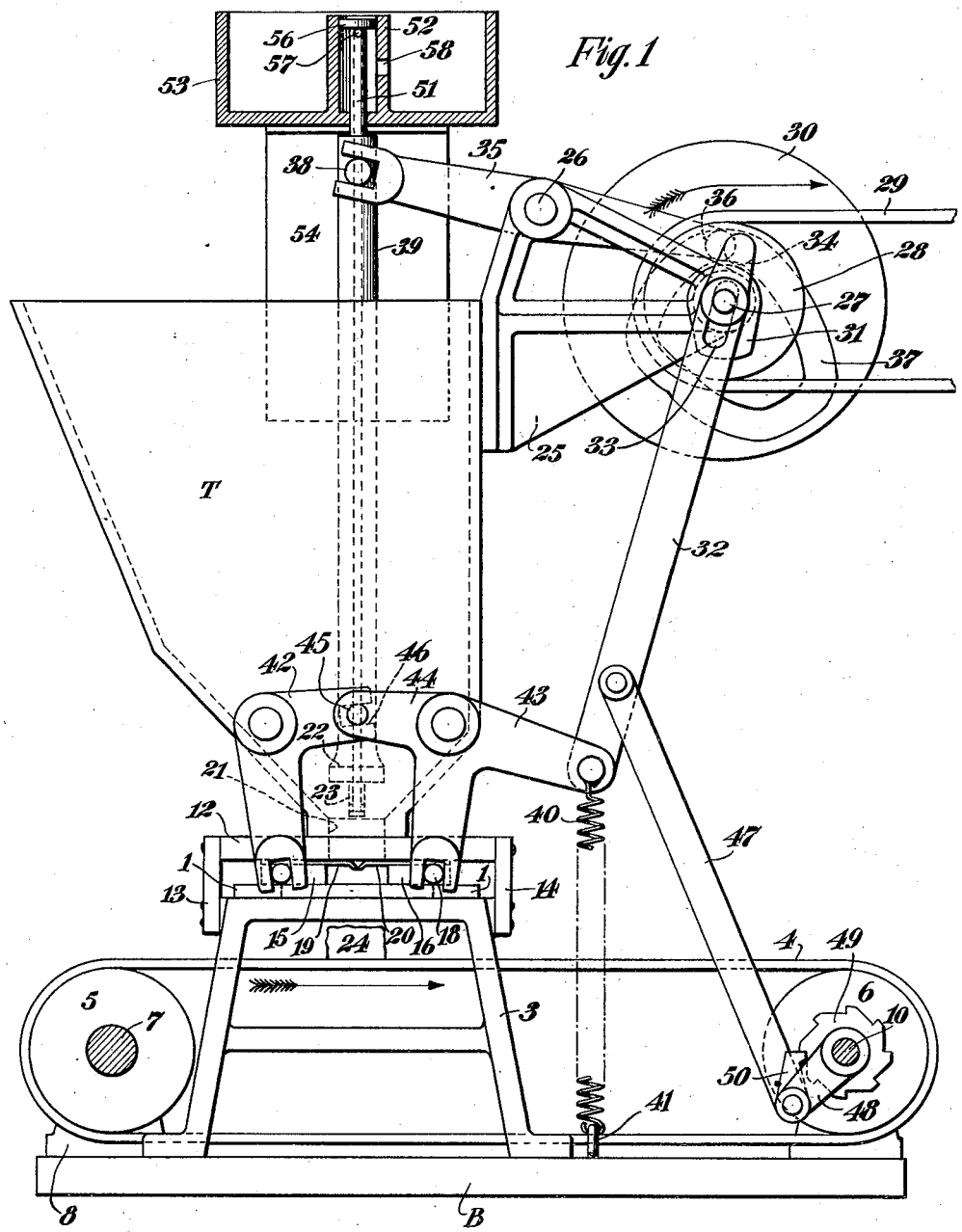

June 24, 1930.   W. B. LASKEY   1,765,874
PROCESS FOR FORMING CANDY
Filed April 26, 1927   2 Sheets-Sheet 1

INVENTOR
William B. Laskey,
BY
Gustav Drews
ATTORNEY

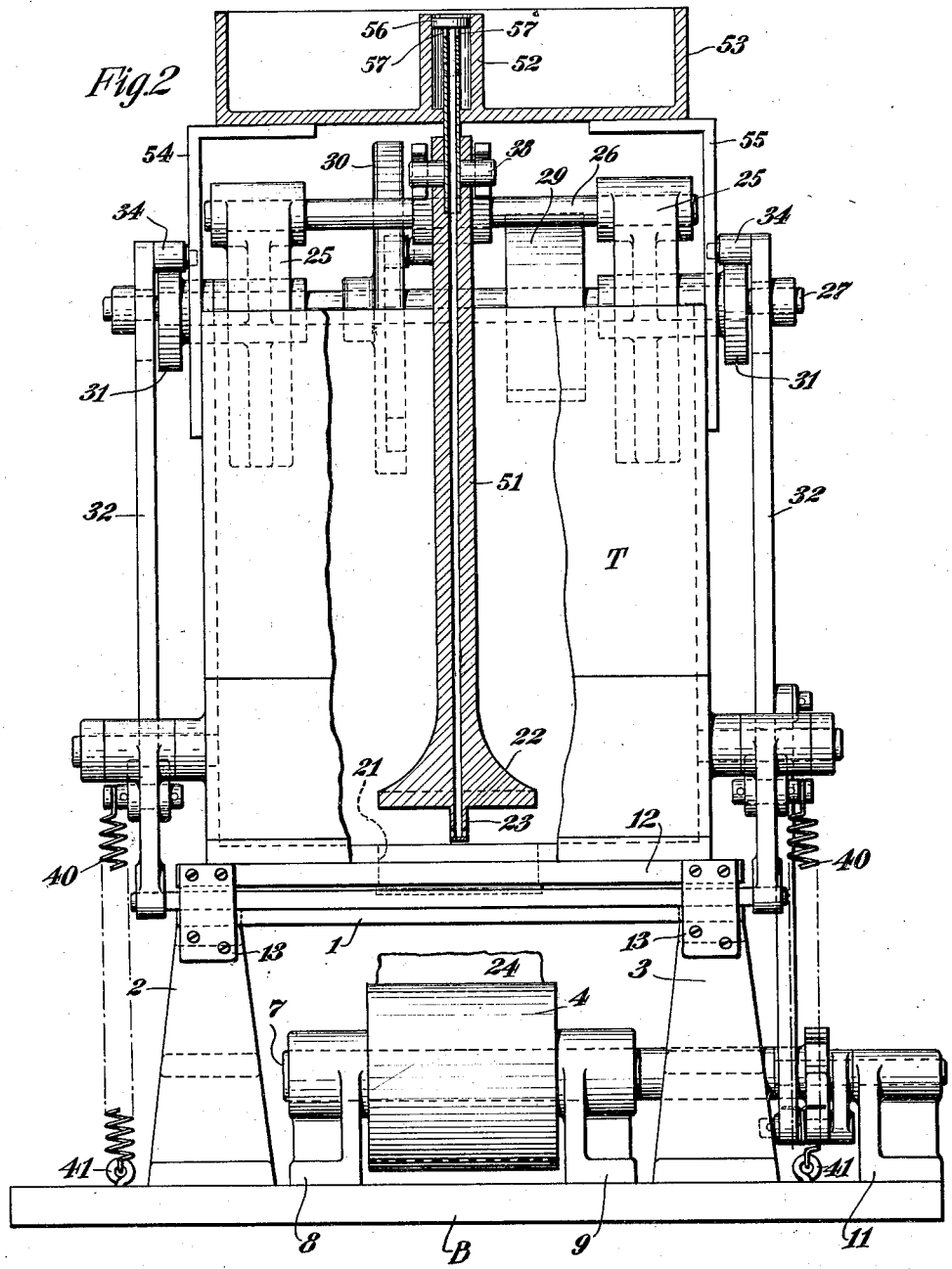

Patented June 24, 1930

1,765,874

UNITED STATES PATENT OFFICE

WILLIAM B. LASKEY, OF BROOKLYN, NEW YORK, ASSIGNOR TO MASON, AU & MAGENHEIMER CONFECTIONERY MANUFACTURING COMPANY, OF BROOKLYN, NEW YORK, A CORPORATION OF WEST VIRGINIA

PROCESS FOR FORMING CANDY

Application filed April 26, 1927. Serial No. 186,626.

This invention relates to processes for forming candy in general, and more especially to forming candy centers composed of a main outer body and a differently constituted inner body.

Among the objects of the present invention it is aimed to provide a process for forming or shaping an outer body member composed of a less fluid material when heated than the material of the inner body member when heated. To this end, the present invention has for a special object to provide a process for forming and shaping a candy or candy center having an outer body member composed of a plastic composition and an inner body member composed of a jelly composition.

It is a further object of the present invention to provide a process for completely forming or shaping an outer body member and thereupon introducing or injecting into such outer body member an inner body member of a different substance.

These and other features, capabilities and advantages of the invention will appear from the subjoined detailed description of one specific embodiment of a machine for carrying out the process forming the subect matter of the present invention, as set forth in the accompanying drawings in which Figure 1 is a side elevation of the complete machine partly in section;

Fig. 2 is a transverse section of the same.

In the embodiment illustrated, there is shown a skeleton platform 1 supported by the two end supports 2 and 3 secured to the base B and spaced from one another to form a space there between for the passage of the conveyor 4 traveling over the pulleys 5 and 6. The pulley 5 is mounted on the shaft 7 supported in the bearings 8 and 9 located to the front of the machine on the base B, while the pulley 6 is mounted on the shaft 10 supported in suitable bearings 11.

Above the platform 1 and spaced therefrom, there is provided the skeleton plate 12 which is connected to the end frames 2 and 3 by the connecting plates 13 and 14. Extending upwardly from the plate 12 and supported thereon, there is provided a tank T which has its front end extending outwardly to facilitate filling the tank T with the material to be formed into candy centers. In the space formed between the platform 1 and the plate 12, there are slidably mounted the knife supporting blocks 15 and 16, the ends of which are provided with the projections 17 and 18 respectively. The blocks 15 and 16 have secured thereto the opposing knives 19 and 20 respectively which operate adjacent to the bottom of the tank T, forming the closure for the discharge opening 21 of the tank T when material is not being extruded therefrom, and in addition also serving to form the upper surfaces of the units being discharged from such opening 21.

In the operation of the machine, the knives 19 and 20 are first opened, and thereupon the material collected in the opening 21 is extruded by the plunger head 22. At the same time that the extrusion takes place and preferably during the latter part of the extruding stroke, the semi-liquid center is expelled from the nozzle 23 extending from the face of the plunger head 22, which nozzle 23 will be imbedded in the unit 24, being extruded when the semi-liquid composition is expelled therefrom.

After the unit of plastic material 24 has been extruded and received its center of semi-liquid composition, it is permitted to fall upon the conveyor 4 which is thereupon advanced an interval. The conveyor is intermittently actuated, being in a position of rest when the unit is discharged thereon, and thereupon being advanced an interval into a position to receive the succeeding unit.

The conveyor 4, cut-off knives 19 and 20, plunger head 22, and the means for causing substance to discharge from the nozzle 23, are preferably all actuated from a single source of power.

In the present instance, there are provided the brackets 25 secured to the upper rear end of the tank T which is provided with a bearing for the pin 26 at its upper end and a bearing for the shaft 27 at its rear end. On the shaft 27, there is fixed the pulley 28 which is driven by the belt 29. On this shaft 27 there is also fixed the box cam 30 and the two cam lugs 31. On this shaft 27 there are slidably mounted the links 32 which are provided with slots 33 through which the shaft 27 extends and with cam rollers 34 at their upper free ends to cooperate with and be engaged by the lugs 31.

On the pin 26, there is mounted the lever 35, one end of which is provided with a projection 36 traveling in the cam slot 37 of the box cam 30, and the other end of which is bifurcated to receive the pin 38 on the plunger shank 39.

The lower ends of the links 32 are connected by the springs 40 with the abutments 41 formed on the base B, by means of which the rollers 34 are yieldably maintained in engagement with cam lugs 31.

To opposite sides of the tank T at the front end thereof, there are pivotally mounted the bent levers 42, the downwardly extending arms of which are bifurcated to receive the pins 17 of the block 15. To the opposite sides of the tank T and at the rear end thereof, there are pivotally mounted the bent levers 43, the downwardly extending arms of which are bifurcated to receive the pins 18. The bent levers 43 have fixed to their pivotal points the arms 44 extending forwardly, and at the front end thereof there are formed the pins 45 engaged by the recesses 46 formed in the rear ends of the rearwardly extending arms of the levers 42. The rearwardly extending arms of the levers 43 are pivotally connected to the lower ends of the links 32.

In this way, the springs 40 function yieldably to maintain the knives in cut-off or closed position, while the lugs 31 oppose the springs 40 to separate the knives to free the opening 21.

The actuation of the near link 32 also serves to actuate the conveyor 4 by the means now to be described. The near link 32 has pivotally connected thereto the link 47, and the lower end of such link 47 is pivotally connected to the short link 48 pivotally connected to the shaft 10 adjacent to the ratchet wheel 49 fixed to travel with the pulley 6. Pivotally connected to the pivotal connection of the links 47 and 48, there is provided the pawl 50 which is yieldably maintained in engagement with the ratchet wheel 49 in the usual way. From this connection it will thus appear that when the lugs 31 actuate the links 32 to ascend, the near link 32 will in turn through the links 47 and 48 actuate the pawl 50 in turn to actuate the ratchet wheel 49. On the other hand, when the lugs 31 swing downwardly to permit the springs 40 to lower the links 32, the links 47 will be returned in the usual way without actuating the ratchet wheel 49.

The plunger shank 39 has provided therein the conduit 51 which extends upwardly into the cylindrical chamber formed by the cylindrical extension 52 extending upwardly from the reservoir 53, the reservoir 53 being secured above the upper end of the tank T by the brackets 54 and 55. The upper end of the conduit 51 is sealed and is provided with a disc 56 fitting snugly in the cylindrical chamber formed by the extension 52. Below the disc 56, there is formed an opening 57 in the conduit 51. In the cylindrical extension 52, there is provided an opening 58. The lower end of the conduit 51, to wit the nozzle 23, is of course open. The openings 57 and 58 are predetermined in their positions respectively relative to the extent of descent of the plunger shank 39. In other words, as the plunger 39 descends and during the last half of its downward stroke, the semi-liquid substance contained in the reservoir 23 is caused to extrude and continues to extrude until the plunger 39 has finished its downward stroke.

The discharge opening 21 in which the nozzle 23 is positioned when raised, in the present instance constitutes the initial forming element, the lateral wall of the opening 21 constituting a mould wall initially to form and shape the lateral face or faces of the unit to be discharged from such opening.

The operation is substantially as follows:

Assume that the candy or candy center to be formed is composed of an outer body of plastic material such as a cocoanut mixture and the inner body member of a semi-liquid material such as a jelly substance. The tank T is then supplied with the plastic material, and the reservoir 53 with the semi-liquid substance. Assume also that the opening 21 of the tank T is shut off by means of the knives 19 and 20 being in closed position where they engage one another, and that the plunger shank 39 is in its raised position with the opening 57 disposed at a level above the opening 58 in the extension 52.

First, the knives 19 and 20 will be caused to be opened due to the cooperation of the cam rollers 34 with the lugs 31 and the springs 40 urging the links 32 downwardly. Simultaneously therewith, the cooperation of the box cam 30 with the projection 36 on the lever 35 will cause the plunger shank 39 to descend. Initially, the head 22 of the shank 39 will merely extrude a unit from the opening 21, with the nozzle 23 extending into such unit 24 down to a short distance from the bottom of the unit. Then as the disc 56 passes below the opening 58 in the extension 52, the disc 56 will act as a piston head to force the substance contained in the extension 52 below the disc 56 into the conduit 51 through the openings 57, whereupon the pressure so exercised will cause the substance contained in the conduit 51 to discharge from the nozzle 23 into the center of the unit 24 until the plunger shank 39 has reached the lower end of its stroke. Thereupon, the knives 19 and 20 will again be caused to close, thereby forming the upper surface of the unit 24, at the same time cutting off the portion of the material extruded, and also closing the opening 21.

Simultaneously, with the closing action of the knives 19 and 20 caused by the actuation of the links 32, the plunger shank 39 will be caused to rise, and thereby withdraw the nozzle 23 out of the pathway of the knives and out of the unit 24 while it is being discharged upon the conveyor 4, and thereupon the link 47 will be reciprocated in turn to advance the conveyor 4 a predetermined interval.

It is of course understood that if, for any reason, the closing operation of the knives 19 and 20 should be out of time relative to the withdrawal of the nozzle 23, jamming of the machine cannot result, since the closing action of the knives 19 and 20 is effected by yieldable spring power, to wit, the spring 40. In other words, if the knives 19 and 20 should close upon the nozzle 23 before the nozzle is withdrawn, the knives will merely be held in yieldable engagement with the nozzle 23 until the nozzle 23 has moved upwardly far enough, whereupon the continued closing tension exercised by the spring 40 on the knives 19 and 20 will then operate to complete the closing action of the knives 19 and 20.

It is obvious that various changes and modifications may be made in the various steps of the process constituting the present invention and in the machine for carrying out such process without departing from the general spirit of the invention set forth in the appended claim.

I claim:

The process of forming and shaping a candy unit composed of a plastic mass and a filling, consisting in segregating and shaping a predetermined amount of plastic material from a main mass of plastic material, segregating a predetermined supply of a second character of substance to constitute the filling, extruding the predetermined amount of plastic material by subjecting the same to a predetermined pressure and simultaneously forming a depression in the same, during the latter portion of the extruding action, extruding a predetermined portion of said segregated second character of substance into the depression formed in the extruded portion of plastic material by subjecting the segregated second character of substance to a predetermined pressure, thereupon cutting off a unit from the portion of plastic mass so extruded to form the upper surface of the unit so formed and simultaneously forming the lower surface of the succeeding unit to be extruded, and thereupon replenishing the segregated predetermined supply of the second character of substance in preparation for the succeeding extruding action.

WILLIAM B. LASKEY.